United States Patent [19]
Looney

[11] 3,881,369
[45] May 6, 1975

[54] BI-AXIAL POSITIONER
[75] Inventor: John H. Looney, Fairport, N.Y.
[73] Assignee: Xerox Corporation, Stamford, Conn.
[22] Filed: Dec. 26, 1973
[21] Appl. No.: 428,157

[52] U.S. Cl. .................. 74/89.2; 33/1 M; 74/89.22; 353/27
[51] Int. Cl. ............................................ F16h 27/02
[58] Field of Search .......... 74/89.2, 89.22, 471 XY; 33/1 M, 18 R; 353/27

[56] References Cited
UNITED STATES PATENTS
3,491,716  1/1970  Ranford ........................... 33/1 M X
3,611,819  10/1971  Muller et al. ...................... 74/89.22

*Primary Examiner*—Samuel Scott
*Assistant Examiner*—F. D. Shoemaker
*Attorney, Agent, or Firm*—Robert J. Bird

[57] ABSTRACT

A combination X-Y positioning mechanism is disclosed. A first link is linearly reciprocable relative to a frame and a second link is linearly reciprocable relative to the first link. The directions of relative reciprocation are mutually perpendicular. The second link is connected at each end to a flexible belt which engages a series of pulleys between its ends. Two of the pulleys are connected to reversible motors for operation in either direction of rotation. Thus, a member to be moved (connected to the second link) can be positioned at any coordinate position on an X-Y coordinate plane.

3 Claims, 2 Drawing Figures

PATENTED MAY 6 1975  3,881,369

3,881,369

BI-AXIAL POSITIONER

BACKGROUND OF THE INVENTION

This invention relates to a mechanism for positioning an object or load member at any desired X-Y coordinate position. One purpose for such a mechanism is for the positioning of microfiche, where a plurality of microform objects are placed in a two dimensional array in X-Y directions relative to a stationary projector.

SUMMARY OF THE INVENTION

It is an object of this invention to provide a mechanism for selective positioning of a member on an X-Y coordinate plane.

Briefly, this invention is practiced in one form by a first link slidably mounted for linear reciprocation relative to a frame and a second link in turn slidably mounted for linear reciprocation relative to the first link. The first and second links move in mutually perpendicular directions relative to each other. A belt is connected at each of its ends to the second link and engages a series of pulleys between its ends. A pair of reversible drive motors engage with two of the pulleys and operate in both directions of rotation to accomplish plus or minus X or Y movement of the second link or a combination of such movements to position a load member anywhere on an X-Y coordinate plane.

For a better understanding of this invention, reference is made to the following detailed description given in connection with the accompanying drawing.

DRAWING

DESCRIPTION

Figure 1:
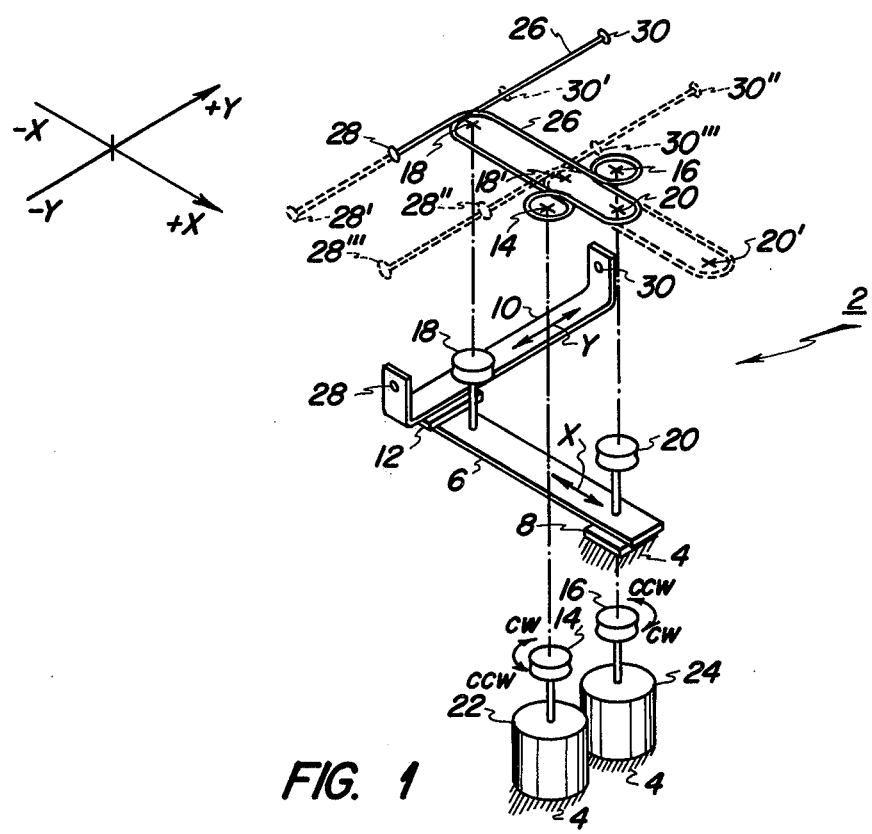
FIG. 1 is an exploded view of a bi-axial positioning mechanism according to this invention, shown in spatial orientation relative to X and Y coordinates.
Figure 2:
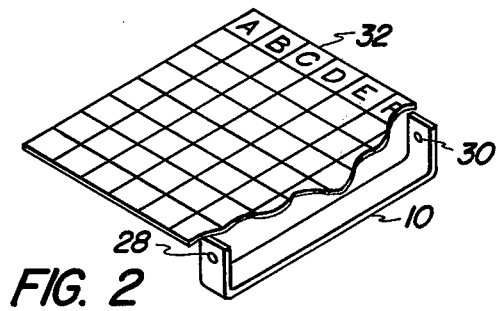
FIG. 2 is representative of a load member connected to the output member of the mechanism shown in FIG. 1.

Referring now to FIG. 1, the bi-axial positioner of this invention is represented generally at 2 and is shown mounted relative to a stationary frame represented at 4. A first link 6 is slidably mounted on a suitable bearing 8 relative to the frame 4 for linear reciprocation in a first, or X, direction. A second link 10 is slidably mounted on a suitable bearing 12 relative to the first link 6 for linear reciprocation in a second, or Y, direction, normal to the X direction. First and second pulleys 14 and 16 are rotatably driven, in clockwise (CW) and counterclockwise (CCW) rotation, by reversible drive motors 22 and 24, respectively, which are in turn stationarily mounted relative to the frame 4. Third and fourth pulleys 18 and 20 are rotatably mounted on the first link 6. Pulleys 14, 16, 18, 20 are all disposed approximately in the same plane. The spatial relationship indicated by the drawing is only for the purpose of illustration.

A flexible drive belt or cable 26 is connected at its ends 28 and 30 to the ends, also designated 28 and 30, of the second link 10. Cable 26 engages in series the four pulleys 14, 16, 18, and 20. Starting from point 28 as a reference, cable 26 extends clockwise around the third pulley 18, counterclockwise around the second pulley 16, clockwise around the fourth pulley 20, counterclockwise around the first pulley 14, and clockwise around the third pulley 18, thence to the other end connection point 30.

Drive belt 26 is in positive or frictional engagement with the pulleys 14, 16, 18, and 20 so there is no sliding of belt relative to pulley. In addition, motors 22 and 24 are either running or still—they do not idle. Thus, each motor contributes to the output motion in three ways; by clockwise rotation, by counterclockwise rotation, and by holding fast.

FIG. 1 shows in phantom several positions of points 28 and 30, represented as 28, 28', 28'', 28''', and as 30, 30', 30'', and 30'''. These four positions represent the extreme X-Y positions of end points 28 and 30.

The following chart is a tabulation of the direction of movement of the second link 10. Motors 22 and 24 are bi-directional and of equal and constant speed.

| Motor 22 | Motor 24 | | |
| --- | --- | --- | --- |
| | CW | CCW | Still |
| CW | −Y | +X | +X/2 −Y/2 |
| CCW | −X | +Y | −X/2 +Y/2 |
| Still | −X/2 −Y/2 | +X/2 +Y/2 | 0 |

Whatever the configuration and arrangement of the pulleys, and that shown is only illustrative, the essential thing is the relationship between the individual effects of the two drive pulleys 14 and 16 on the drive belt 26. If pulleys 14 and 16 both motivate the belt 26 in the same direction with reference to its ends 28 and 30, then the combined pulley effect is additive and the driven member 32 is moved along one axis (the Y axis in the illustration). If the pulleys motivate the belt in opposite directions, the combined effect is subtractive and the driven member 32 is moved along the other axis (the X axis in the illustration). If one pulley is still and acting as a brake, the combined effect is to move the driven member 32 equally along both axes, or at 45° with respect to each.

The foregoing description of an embodiment of this invention is given by way of illustration and not of limitation. Motors 22 and 24 have been described as of equal and constant speed. While this is presently preferred, it is not essential. Pulleys 14, 16, 18, and 20 are shown all rotating in the same plane, but again this is not essential. Pulleys 14 and 16 could easily be tilted 90° so as to be "facing" each other, for example. Accordingly, the concept and scope of the invention are limited only by the following claims and equivalents thereof which may occur to others skilled in the art.

What is claimed is:

1. A drive mechanism for positioning a driven member at any desired coordinate position on an X-Y coordinate plane, including:
    a frame,
    a first link operatively connected to and reciprocable relative to said frame in an X direction,
    a second link operatively connected to and reciprocable relative to said first link in a Y direction, normal to said X direction,
    a first and a second pulley rotatably mounted to first and second reversible drive motors respectively, said drive motors being mounted on said frame,
    a third and a fourth pulley rotatably mounted on said first link, a drive belt connected at each of its ends to said second link and operatively engaging said pulleys, said drive motors being selectively actuable in either direction of rotation and braked against rotation when not energized for rotation, to effect a desired direction of displacement of the driven member in said X-Y coordinate plane.

2. A drive mechanism as defined in claim 1 in which said driven member is displaced in a first direction when said motors are operating in a first combination of rotational direction, and in a direction the reverse of said first direction when said motors are operating in rotational directions opposite to said first combination, and in a second direction normal to said first direction when said motors are operating in a second combination of rotational directions and in a direction the reverse of said second direction when said motors are operating in rotational directions opposite to said second combination, said second combination of rotational directions differing from said first combination of rotational directions by one of said motors operating in opposite rotational directions in said first and second combinations.

3. A drive mechanism as defined in claim 1 wherein said drive motors cooperate to drive said drive belt additively for displacement of the driven member in a first direction, subtractively for displacement of the driven member in a second direction normal to said first direction, and individually one motor at a time for displacement of the driven member along a locus having components of said first and said second direction.

* * * * *